United States Patent [19]
Racca

[11] Patent Number: 4,597,567
[45] Date of Patent: Jul. 1, 1986

[54] ADJUSTABLE TORSION SPRING

[75] Inventor: Romulus Racca, Weston, Mass.

[73] Assignee: Barry Wright Corporation, Newton, Mass.

[21] Appl. No.: 665,319

[22] Filed: Oct. 26, 1984

[51] Int. Cl.⁴ .............................. F16F 1/14; F16F 1/36
[52] U.S. Cl. .................................. 267/140.2; 248/397;
248/609; 248/575; 297/301; 267/141.1;
267/153; 267/154
[58] Field of Search .................. 267/154-157,
267/153, 140.2, 140.4, 141, 141.1-141.7, 57.1 R,
57, 63, 54 A, 57.1 A, 131, 133; 297/301, 303,
304, 333; 248/609, 608, 561, 397, 575, 576;
16/308, 298-301, DIG. 36; 403/132, 133

[56] References Cited

U.S. PATENT DOCUMENTS

| | | | |
|---|---|---|---|
| 1,862,943 | 6/1932 | Saives | 267/54 A |
| 1,920,436 | 8/1933 | Riker | 267/54 A X |
| 2,095,947 | 10/1937 | Herold | 287/85 |
| 2,167,508 | 7/1939 | Herold | 248/609 X |
| 2,228,719 | 1/1941 | Bolens | 297/303 X |
| 2,590,711 | 3/1952 | Krotz | 267/21 |
| 3,134,585 | 5/1964 | Trask | 267/141.1 X |
| 3,504,881 | 4/1970 | Pillons et al. | 248/609 X |

Primary Examiner—Douglas C. Butler
Attorney, Agent, or Firm—Milton E. Gilbert; Gary E. Ross

[57] ABSTRACT

A spring for creating adjustable torsional resistance between two members which are pivotal relative to each other. The spring comprises a stack of axially aligned elastomer torsion rings (30). A locking ring (34) is secured to and separates adjacent torsion rings, one locking ring being associated with each torsion ring. The assembled stack is firmly attached to one of the pivotal members (14). There is connecting sleeve (46) engageable selectively with each locking ring and with the other relatively pivotal member. The number of torsion rings exposed to pivotal motion between the members to vary the torsional resistance of the spring is determined by engagement between the connecting sleeve and selected locking rings.

14 Claims, 8 Drawing Figures

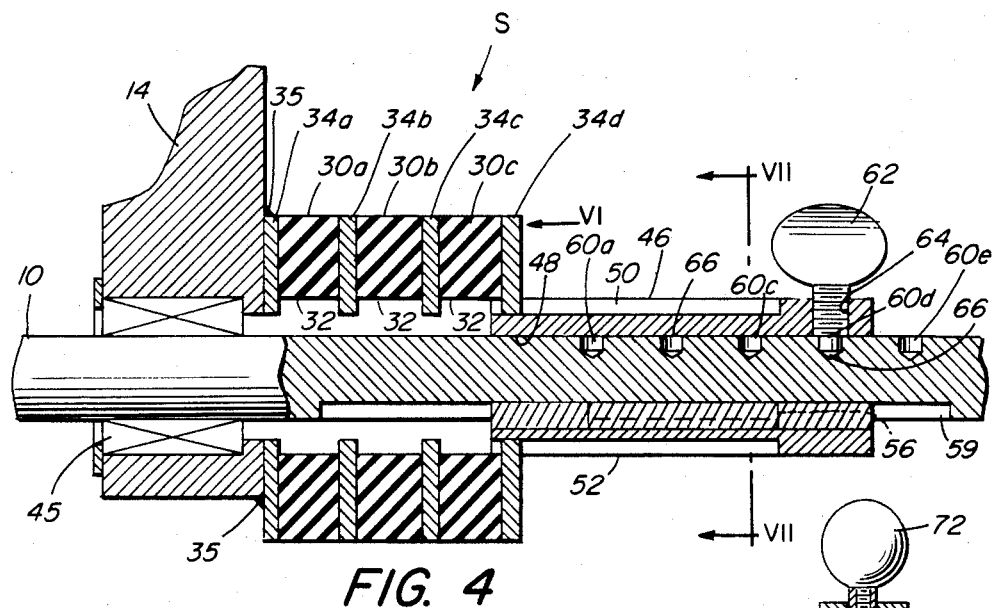
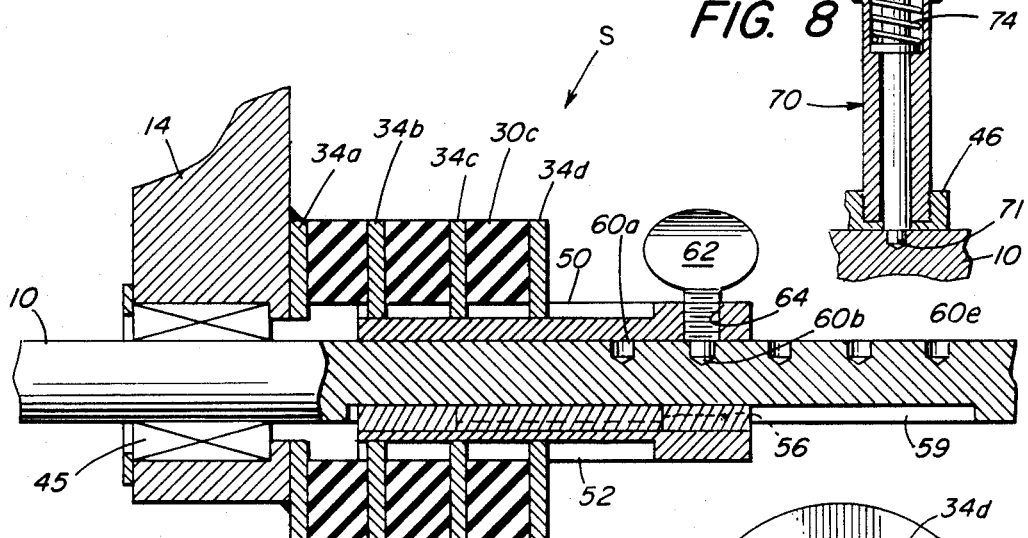
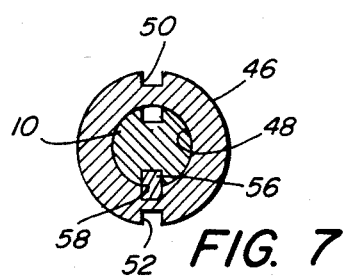
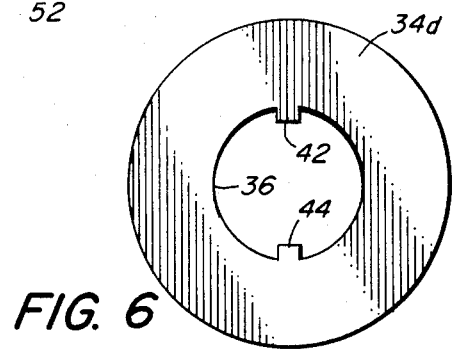
FIG. 4
FIG. 8
FIG. 5
FIG. 7
FIG. 6

ADJUSTABLE TORSION SPRING

TECHNICAL FIELD

This invention relates in general to springs for creating adjustable torsional resistance between two members which pivot relative to each other and more specifically to adjustable torsion springs which have particular utility in seats, chairs and the like.

BACKGROUND OF THE INVENTION

Generally, seats, chairs, rockers and for that matter any device intended to pivot or rock relative to a base, conventionally uses metal coil springs to create torsional resistance to the rocking motion. To increase or decrease the degree of stiffness of the spring, mechanisms are usually employed to change the torsional properties of the spring by twisting or compressing the spring or otherwise changing its shape.

While the desired results of torsional adjustability usually have been obtained, it has not been without ancillary problems. Friction occurs between the spring and the adjusting mechanism (usually metal) used to compress or twist it. Lubrication is required, not only to reduce friction, but also to prevent squeaking. The mechanisms are frequently complex and often costly to manufacture.

Another problem with springs which require their shape to be changed to vary their torsional properties is that considerable force is necessary to deform the spring. Hand wheels, levers, and cams used for this purpose require considerable manual strength to operate, often more than can be summoned, if the user is of advanced age or is infirm.

Accordingly, one of the objects of this invention is to produce an adjustable torsion spring, the torsional properties of which may be varied with little human effort being required.

Another object of the invention is to produce an adjustable torsion spring which is relatively frictionless and requires little or no lubrication.

Yet another object is to produce a simple, inexpensive adjustable spring, the torsional properties of which may be changed without changing the shape of the spring.

SUMMARY OF THE INVENTION

In accordance with the above objects, the invention resides in a spring for creating adjustable torsional resistance between two members which are pivotal relative to each other. The spring comprises a stack of axially aligned elastomer torsion rings, separated by axially aligned locking rings which are firmly secured to the elastomer rings by vulcanization or the like. Connecting means are provided which are engageable selectively with each locking ring and with one of the pivotal members while the stack of torsion rings is firmly attached to the other pivotal member. The amount of torsional resistance is the inverse function of the axial length of the spring. The location of the connecting member determines the number of torsion rings which are exposed to the rocking motion between the pivotal members. This determines its effective length of the spring and hence its stiffness.

The above and other features of the invention including various novel details of construction and combinations of parts will now be particularly described with reference to the accompanying drawings and pointed out in the claims. It will be understood that the particular adjustable torsion spring embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIGS. 4 and 5 are sectional views of the adjustable torsion spring shown in two positions of adjustment.

FIG. 6 is an end view of a locking ring taken in the direction of the arrow VI on FIG. 4.

FIG. 7 is a sectional view through the torsion spring taken in the direction of the arrows VII—VII on FIG. 4.

FIG. 8 is a spring biased detent which may be employed as an alternative element in the spring.

BEST MODE OF CARRYING OUT THE INVENTION

Figure 1:
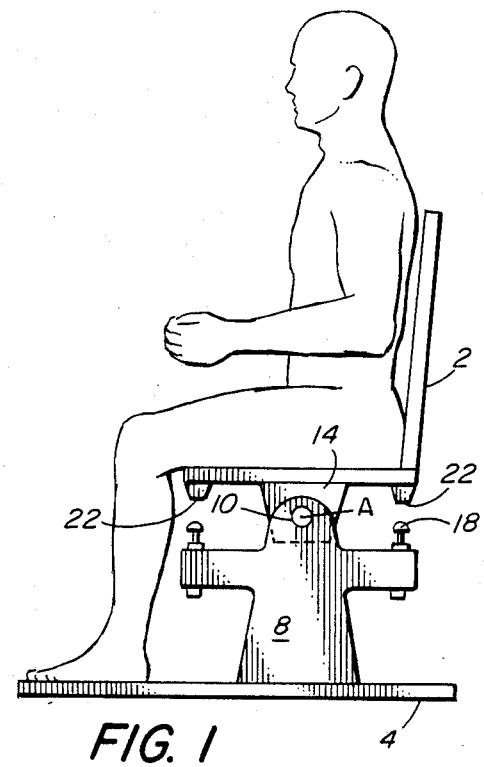
FIG. 1 is a side elevation, including a human figure, of a chair having torsin spring mechanism embodying the features of the present invention.
Figure 2:
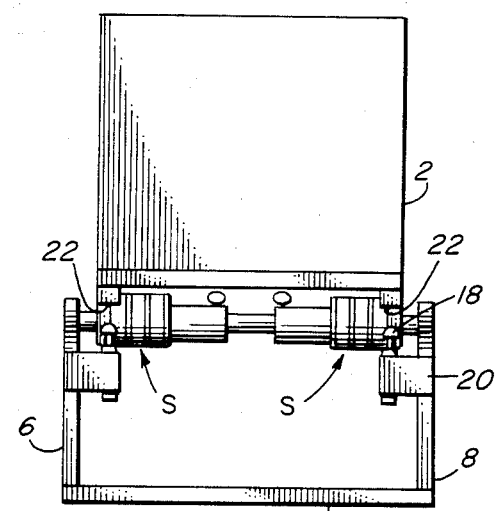
FIG. 2 is a front view of the chair shown in FIG. 1 but with the figure removed.
Figure 3:
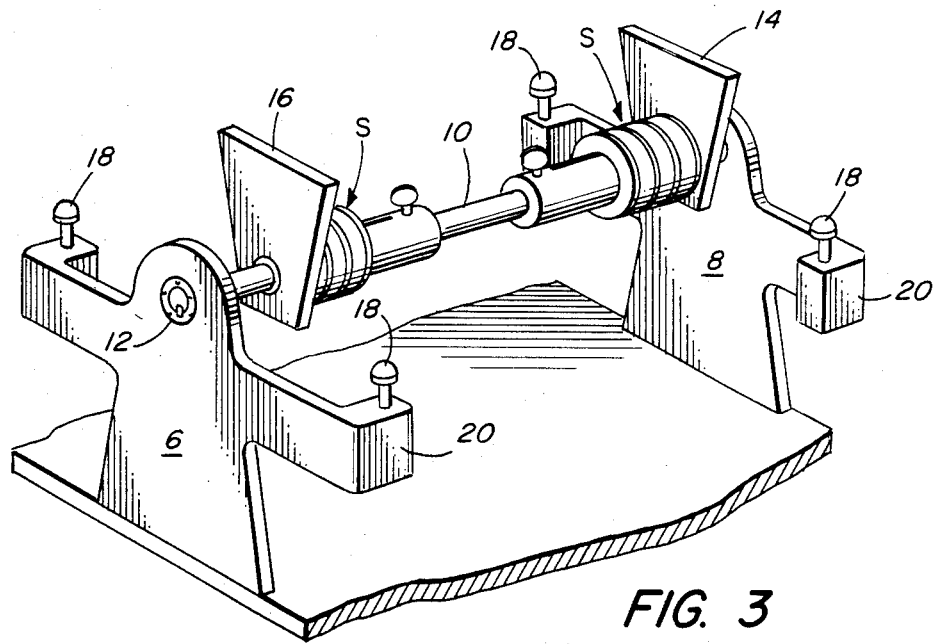
FIG. 3 is a perspective view with parts broken away of the chair shown in FIG. 1 on which a pair of adjustable torsion springs are employed.

The invention as seen in FIGS. 1 to 3 is employed with a seat 2 which is mounted for limited pivotal or rocking motion on a base 4. The seat and base are representative of a platform rocker, a wheelchair, an office chair or any other form of chair. As will become apparent hereinafter, the invention may in its broadest sense be embodied in any mechanism requiring a spring for creating adjustable torsional resistance between two members which pivot relative to each other.

The seat 2 pivots about an axis A which extends horizontally between two support members 6 and 8 extending upwardly from the base 4. The axis A is defined by the center of a bar or rod 10 which extends between the support members 6 and 8. Its ends are secured against rotation as, for example, by being keyed to flanges 12 in the support members (one of which is seen in FIG. 3).

The seat 2 has a pair of depending brackets 14 and 16 pivotally mounted on the bar 10 as will be described in more detail hereinafter. The degree of angular pivoting of the seat 2 relative to the base 4 is limited by stops 18 threaded for vertical adjustment in portions 20 of the supports 6 and 8. Depending bumpers 22, two each on the front and back of the seat 2, engage the forward and rearward stops 18 to limit the amount of forward and rearward tilting motion.

One of the two identical adjustable torsion springs S shown in the illustrated embodiment of FIGS. 1–3 will now be described with particular reference to FIGS. 4–7. Each torsion spring S comprises a stack of axially aligned elastomer torsion rings or segments 30a, 30b and 30c which are circular disks having holes 32 in their centers. The elastomer disks are separated by locking rings in the form of circular plates 34a, 34b, 34c and 34d of the same diameter as the torsion rings and each having a hole 36 in the center of the same diameter as the holes 32 in the torsion rings.

As will be seen in FIG. 6, the locking ring or plate 34d (as well as the other rings) has at least one and preferably two diametrically opposed tangs 42 and 44 extending into the hole 36. The torsion rings and locking rings are firmly bonded together by vulcanizing or other elastomer-to-metal bonding means. The endmost locking plate 34a is securely fastened by a weldment 35 or the equivalent to the face of the bracket 14 which depends from the seat 2. The rod 10 passes through the centers of the assembled elastomer rings and locking plates. It also passes through a bearing 45 in the depending bracket 14 permitting the bracket and hence the seat 2 to pivot on the non-rotatable bar 10.

Connecting means in the form of a circular sleeve 46 is slidably mounted on the bar 10 and is movable into and out of the aligned holes 32 in the elastomer disks 30 and the holes 36 in the locking plates 34. The outer diameter of the sleeve 46 is slightly less than the diameter of the holes 32, 36 in the torsion disks and locking plates to permit easy sliding motion therebetween. Conversely, the inner diameter 48 of the sleeve 46 (see FIG. 7) is slightly larger than the outer diameter of the bar 10, also to permit easy sliding motion.

A slot 50 is formed in the outer diameter of the sleeve 46 to engage the tangs 42 of the locking rings 34. In alignment with the slot 50 is a diametrically opposite slot 52 to engage the tangs 44 of the locking rings 34. The tangs 42 and 44 (see FIG. 6) extending into the holes in the centers of the locking plates 34 are receivable within the slots 50 and 52 respectively as will be explained in more detail hereinafter.

While capable of sliding motion axially of the rod 10, the sleeve 46 is prevented from rotating around the rod by a sunk key 56 which fits in a slot 58 in the sleeve 46 and a mating slot 59 in the rod 10. The slot 59 in the rod 10 is longer than the sleeve 46 to permit sliding movement of the sleeve relative to the rod.

A plurality of holes 60a to 60e are formed in the rod 10 diametrically opposite the slot 59. A detent in the form of a thumb screw 62 is threaded into a tapped hole 64 at the right hand end of the sleeve 46 as seen in FIGS. 4 and 5. A detent portion 66 of the screw 62 is engageable selectively in holes 60a through 60e in the rod 10 to lock the sleeve at selective positions on the rod 10 and hence relative to the spring S.

The center line spacing between adjacent holes 60 is equal to the centerline spacing of the locking plates 34. It will be noted, however, that there is one more hole than there are locking plates.

The adjustable torsion spring operates as follows: As viewed in FIG. 4, the thumb screw 62 is positioned in the hole 60d in the rod 10. As a result, the walls of the slots 50 and 52 in the sleeve 46 engage the tangs 42-44 of only the locking plate 34d. This exposed all three elastomer segments 30 a, b and c to rocking motion of the seat, which motion is transmitted through the depending brackets 14 and the locking plate 34a which is firmly secured to it. This particular setting with all three elastomeric segments exposed to torsional stress (the sleeve 46 and the rod 10 being locked against pivotal motion) results in the least amount of torsional rigidity of the spring. This is because torsional resistance is an inverse function of the length of the spring or of the number of elastomer segments exposed to twisting.

When greater stiffness is required, the thumb screw 62 is removed from the hole 60d and the sleeve is moved to the left as, for example, to the FIG. 5 position and inserted into the hole 60b. The walls of the slots 50-52 in the sleeve engage the tangs on locking plates 34b, c and d. This also locks out elastomer disks 30b and 30c permitting only disk 30a to offer resistance to the rocking motion of the chair. This results in the maximum spring stiffness.

Should it be desired to completely immobilize the spring and lock the seat against all rocking, the sleeve 34 is moved as far to the left as possible and the thumb screw 62 is inserted into the hole 60a. At this time the walls of the slots 50 and 52 engage the tangs 42 and 44 of all of the locking plates including the endmost plate 34a which is fixed to the bracket 14. This prevents motion from being transmitted to any of the elastomer disk segments and thus locks the seat in non-rocking position.

As an alternative to the wing nut 62, a spring biased detent 70 seen in FIG. 8 may be threaded in the sleeve 46. Its detent tip 71 is removed from engagement with any hole 60 merely by pulling up on the upper ball portion 72 and when the tip 71 is in alignment with a desired hole is allowed to drop into it under the force of compression spring 74. This construction aids persons of little manual dexterity.

As the degree of stiffness of the spring S is adjusted simply by sliding the sleeve 46 in and out of the spring successively to engage the desired locking disks, the amount of forward and backward movement can also be adjusted by screwing the threaded stops 18 upwardly or downwardly in bracket portions 20 on the base 4 of the chair. To make this procedure easier, sleeve 46 would be moved as far to the right as possible, placing the thumb screw 62 or detent 70 in hole 60e. This completely disengages the sleeve 46 from contact with all locking disks, permitting the seat to pivot freely on the rod 10.

It will thus be seen that the tension of the spring may be adjusted without changing its shape, its tension being determined by the positioning of the locking sleeve. By this mechanism, people with little manual strength may adjust their chair, be they wheelchairs, platform rockers, hospital chairs and the like with little or no assistance from others.

While two springs are shown in the illustrative embodiment located inboard of the depending brackets 14 and 16, they could, without departing from the scope of the invention, be located outboard thereof or even outboard of the brackets 6 and 8 (with the brackets 14 and 16 and brackets 6 and 8 reversed) to make the springs more accessible to the user. A single spring may be employed as long as one end is firmly connected to the seat and the other keyed to the rod. In its broadest sense, the adjustable torsion spring would not be limited to use with a seat but could be used with any two members which pivot relative to each other.

I claim:

1. A spring for creating adjustable torsional resistance between two members which are pivotal relative to each other, comprising:
   a stack of axially aligned elastomer torsion rings, each torsion ring having an internal aperture,
   axially aligned locking rings firmly secured to and separating adjacent torsion rings, there being one locking ring associated with each torsion ring, each locking ring having an internal aperture,
   the stack of torsion rings and locking rings being firmly attached to a first pivotal member,
   an elongate connecting means slidable into and out of the aperture in the stack,
   at least one axially extending slot in the connecting means, at least one tang on each locking ring projecting into the aperture in the stack and aligned with and engageable within the slot in the connecting means, means preventing the connecting means from rotating relative to the second pivotal member and means for positioning the connecting means at predetermined axial positions relative to the stack to engage the slot in the connecting means selectively with the tangs of one or more locking rings to selectively change the number of torsion rings exposed to the pivotal motion between the members to vary the torsional resistance of the spring.

2. A spring according to claim 1 wherein one of the two members which are pivotal relative to each other is stationary.

3. A spring according to claim 1 wherein the connecting means is a slotted sleeve.

4. A spring according to claim 1 wherein there are adjustable means for limiting the degree of pivotal movement between the two relatively pivotal members.

5. A spring for creating adjustable torsional resistance between two members which are pivotal relative to each other, comprising:

a stack of axially aligned elastomer torsion rings, each torsion ring having an internal aperture, axially aligned locking rings firmly secured to and separating adjacent torsion rings, there being one locking ring associated with each torsion ring, one end of the stack of torsion rings and locking rings being firmly attached to a first relative pivotal member, a connecting sleeve slidable into and out of the aperture in the stack, at least one axially extending slot in the connecting sleeve, at least one tang on each locking ring projecting into the aperture in the stack and aligned with and engageable within the slot in the sleeve, means preventing the sleeve from rotating relative to the second relative pivotal member and means for positioning the sleeve at predetermined axial positions relative to the stack to engage the slot in the sleeve selectively with the tangs of one or more locking rings to selectively change the number of torsion rings exposed to the pivotal motion between the members to vary the torsional resistance of the spring.

6. A spring according to claim 5 wherein the means for preventing the sleeve from rotating is a rod attached to the second relative pivotal member and upon which the sleeve is slidable, the sleeve being keyed to the rod.

7. A spring according to claim 5 wherein the second relative pivotal member is attached to a rod upon which the sleeve is slidable, spaced holes in the rod and detent means on the sleeve engageable selectively with each hole to position the sleeve lengthwise on the rod, the spacing between the holes being the same as the spacing between the locking rings, each locking ring being associated with one hole.

8. A spring according to claim 5 wherein the second relative pivotal member is attached to a rod upon which the sleeve is slidable, spaced holes in the rod and detent means on the sleeve engageable selectively with each hole to position the sleeve lengthwise on the rod to engage selected locking rings, the spacing between the holes being the same as the spacing between the locking rings, each locking ring being associated with one hole, there being one more hole in the rod than there are locking rings, which hole is not associated with any locking ring, whereby when the detent is in the non-associated hole, none of the torsion rings are exposed to pivotal motion and the pivotal member is free to pivot on the rod.

9. A spring according to claim 5 wherein the second relative pivotal member is attached to a rod upon which the sleeve is slidable, spaced holes in the rod and detent means on the sleeve engageable selectively with each hole to position the sleeve lengthwise on the rod to engage selected locking rings, the spacing between the holes being the same as the spacing between the locking rings, each locking ring being associated with one hole, one of the locking rings being firmly secured to the first relative pivotal member whereby when the detent is in the hole associated with the secured locking ring the first relative pivotal member is locked to the rod to prevent the members from pivoting relative to each other.

10. A spring for creating adjustable torsional resistance between a fixed member and pivotal member comprising:

a stack of axially aligned elastomer torsion rings, each torsion ring having an internal aperture, axially aligned locking rings firmly secured to and separating adjacent torsion rings, there being one locking ring associated with each torsion ring, each locking ring having an internal aperture, one end of the stack of torsion rings and locking rings being firmly secured to the pivotal member, a rod passing through the internal aperture in the stack of aligned torsion rings and locking rings, the rod being firmly secured to the fixed member, a connecting sleeve slidable on the rod into and out of the aperture in the stack, at least one axially extending slot in the connecting sleeve, and at least one tang on each locking ring projecting into the aperture in the stack and aligned with and engageable within the slot in the connecting sleeve and means for positioning the sleeve at pre-determined positions on the rod to engage the slot in the sleeve selectively with the tangs of one or more locking rings to selectively change the number of torsion rings exposed to the pivotal motion between the members to vary the torsional resistance of the spring.

11. A spring according to claim 10 wherein the positioning means includes:

spaced holes in the rod and detent means on the sleeve engageable selectively with each hole to position the sleeve lengthwise on the rod to engage the tangs of selected torsion rings.

12. A spring according to claim 10 wherein the positioning means includes:

spaced holes in the rod and detent means on the sleeve engageable selectively with each hole to position the sleeve lengthwise on the rod, the spacing between the holes being the same as the spacing between the locking rings, each locking ring being associated with one hole.

13. A spring according to claim 10 wherein the positioning means includes:

spaced holes in the rod and detent means on the sleeve engageable selectively with each hole to position the sleeve lengthwise on the rod to engage the tangs of selected locking rings, the spacing between the holes being the same as the spacing between the locking rings, each locking ring being associated with one hole, there being one more hole in the rod than there are locking rings, which hole is not associated with any locking ring, whereby when the detent is in the non-associated hole none of the torsion rings are exposed to pivotal motion and the pivotal member is free to pivot on the rod.

14. A spring according to claim 10 wherein the positioning means includes:

spaced holes in the rod and detent means on the sleeve engageable selectively with each hole to position the sleeve lengthwise on the rod to engage selected locking rings, the spacing between the holes being the same as the spacing between the locking rings, each locking ring being associated with one hole, one of the locking rings being firmly secured to the pivotal member whereby when the detent is in the hole associated with the secured locking ring the pivotal member is locked to the rod to prevent pivoting.

* * * * *